UNITED STATES PATENT OFFICE.

DANIEL E. SOMES, OF WASHINGTON, DISTRICT OF COLUMBIA.

IMPROVED MODE OF COOLING AIR IN BUILDINGS AND CHAMBERS.

Specification forming part of Letters Patent No. 48,456, dated June 27, 1865.

*To all whom it may concern:*

Be it known that I, DANIEL E. SOMES, of Washington, in the District of Columbia, have invented a new and Improved Mode of Cooling Air in Buildings and Chambers and for Excluding Warm Air from the Same; and I do hereby declare that the following is a full and exact description thereof.

The nature of my invention consists in constructing or placing tanks or other vessels, receptacles, or buildings in the earth at a sufficient distance below the surface thereof to attain a cool temperature during the warm season, wherein meats may be salted and cured, and other articles of food and other substances may be preserved from the decomposing effects of a warm atmosphere or the chilling effects of winter weather.

To enable others skilled in the art to make and use my invention, I will proceed to describe its construction and operation.

These vessels may be simply inserted in the earth with earth surroundings, or they may be—which is preferable—surrounded by water at or near its lowest degree of temperature. They may be made in any form which taste or convenience may suggest, or they may be made with a series of walls and air-chambers or other non-conducting mediums to prevent the warm earth or water near the surface from raising the temperature of the air within them.

The bottom of the vessels should be single, (though I do not confine myself to that arrangement,) in order that the effects of the cold earth or water may be readily felt inside of the receptacle in which the articles are kept which are to be salted, cured, or preserved. It is also desirable to have in the chamber or channel or chamber immediately surrounding the inner surface or wall of the vessel or receptacle water rising from the bottom, so as to aid in cooling the articles within.

In the salting of meats or fish and the like it will generally be found that the water—say from ten to fifteen feet below the surface of the earth—will be sufficiently cold to keep the tank in a condition to cure the meat perfectly without the use of ice, and also to preserve most kinds of food or other perishable articles; but it may be necessary in some instances to use ice or some other cooling mixture or substance.

In packing-houses large vats or other vessels should be constructed as above described, in which water or weak brine may be used to cool meats before being placed in the salting-tanks, or the meat may be thus cooled and salt or other curing properties thereafter added to the same. If brine be used in this cooling process, care should be taken that the same be not made too strong. If it be of sufficient strength to check and prevent the flow of blood from the meat, that is all that is required. When the meat is thus cured it should be assorted and packed in barrels or other packages.

It will also be found of great value to construct buildings of iron or other suitable material under water near or under docks in large cities where land is dear. These buildings should be sunk below the bed of the river or bay where they are located, with an entrance from a warehouse or other building; or they may be constructed with a portion of them extending above the surface of the water or earth for an entrance, so connected with the main building, which is submerged, that an easy entrance may be had at all times thereto by descending a stairway to the bottom thereof, which should be on a level with the bottom of the main submerged building and separated therefrom by suitable partitions and doors or other proper means of ingress and egress. In order to supply these subterranean buildings with fresh air without raising the temperature within I place air-tubes outside of the walls, or in a channel in said walls, or through water-tanks, water-pipes, or their equivalents. These tubes should be made larger at the bottom or outlet and should taper toward the end outside of the building, where the air enters. This will bring in contact with the cold water a larger amount of surface to be cooled, and the portion of the tubes which are at the coldest point in the water will contain a larger volume of air, and as the air becomes condensed and heavier it will fall into the building by its own weight, drawing the warm air into the outer end of the tubes with greater rapidity and force than if the tubes were of equal size from end to end or smaller at the outer end. I also provide for a thorough ventilation of these buildings or tanks by placing tubes or flues larger than those conducting the air above described running from near the top of the room outward and upward. Both classes of tubes should be provided with valves or registers, so that the current of air may be regulated or entirely cut off, as may be found desirable.

In cellars and buildings constructed without reference to my inventions, and when it is not convenient to sink tanks in water, I raise the water from beneath the surface of the earth by the same or similar means described in patents heretofore granted to me—to wit, by raising water in pipes inclosed in a box or series of boxes or walls to exclude the warm atmosphere. In such boxes air is admitted around the pipes, and, if desirable, air-tubes may be admitted into and through the water-pipes also, in order that the air passing through the tubes and over the pipes may become cooled by the water within to be conducted to any part of the building or cellar.

When the premises are near a river-dock or other body of water air-pipes may be extended into the water and the air drawn into the building or cellar by means of an air-pump or its equivalent, with the inlet so small that the suction will produce rarefaction, thus lowering the temperature on its passage into the building.

A portion of the tube may be surrounded with ice or other cooling substance, so that the air, after attaining the same temperature as the water in which the air-tubes are placed, may be still further cooled by the ice or other cooling substance by which the tube is surrounded.

The air may be drawn through channels or pipes surrounding the tanks or vessels in which any substance may be placed for curing or preservation, or it may be conducted through the same, as may be most convenient and desirable.

By these means I am enabled to thoroughly cool such tanks or vessels to any degree necessary for preserving their contents; and also, if I see fit, to conduct the same air, when cooled, into other buildings or apartments and cool the same, thus securing great economy in the use of my cooling apparatus.

My process of ventilation secures an object heretofore deemed unattainable—namely, rendering a submerged building, tank, or vessel absolutely free from the noxious vapors always generated by pent-up air, and making such buildings, tanks, or vessels always healthful and salubrious. Families might live in such structures with far less risk to life and health than in a large number of dwellings erected in the usual mode above the ground.

Volatile substances—such as petroleum, benzine, and the like—when stored in buildings constructed in the usual form, are subject to great losses by evaporation in the heated air, and they also endanger the buildings and all employed therein by the generation of combustible gases. All such losses and risks are avoided by the use of my devices for storehouses and the ventilation thereof, both above and below the water or surface of the earth.

What I claim as my invention, and desire to secure by Letters Patent, is—

1. Constructing submarine buildings or chambers substantially as and for the purposes described.

2. Ventilating submarine buildings, tanks, or chambers, substantially as described, and for the purposes set forth.

3. Cooling air by the means and for the purposes herein set forth.

4. Cooling tanks and their contents in the manner herein specified.

5. Constructing and ventilating buildings, chambers, or tanks below the surface of the earth, for the purpose and in the manner herein set forth.

D. E. SOMES.

Witnesses:
J. C. SMITH,
JOHN DAY.